United States Patent
Kinouchi et al.

(10) Patent No.: US 12,311,486 B2
(45) Date of Patent: May 27, 2025

(54) NUMERICAL CONTROLLER AND MACHINING SYSTEM

(71) Applicant: FANUC CORPORATION, Yamanashi (JP)

(72) Inventors: Ryo Kinouchi, Yamanashi (JP); Shingo Tachiki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 39 days.

(21) Appl. No.: 18/261,786

(22) PCT Filed: Apr. 6, 2021

(86) PCT No.: PCT/JP2021/014625
§ 371 (c)(1),
(2) Date: Jul. 17, 2023

(87) PCT Pub. No.: WO2022/215166
PCT Pub. Date: Oct. 13, 2022

(65) Prior Publication Data
US 2024/0066652 A1 Feb. 29, 2024

(51) Int. Cl.
*B23Q 16/10* (2006.01)
*G05B 19/4155* (2006.01)

(52) U.S. Cl.
CPC ....... *B23Q 16/105* (2013.01); *G05B 19/4155* (2013.01)

(58) Field of Classification Search
CPC ... B23Q 16/105; G05B 19/4155; G05B 19/18
See application file for complete search history.

(56) References Cited

U.S. PATENT DOCUMENTS

| 2017/0239770 A1* | 8/2017 | Tachiki | B23Q 16/105 |
| 2020/0139500 A1* | 5/2020 | Tachiki | B23Q 16/105 |
| 2020/0316741 A1* | 10/2020 | Tachiki | B23Q 5/12 |

FOREIGN PATENT DOCUMENTS

| CN | 103760818 A | 4/2014 |
| JP | H06-155231 A | 6/1994 |

(Continued)

OTHER PUBLICATIONS

Translation of JP-2015155144-A, Hiroki, Aug. 27, 2015 (Year: 2015).*

(Continued)

*Primary Examiner* — Daniel D Yabut
(74) *Attorney, Agent, or Firm* — Studebaker Brackett PLLC (57) ABSTRACT

A numerical controller for use in a machining system including a rotary table device that has a table, a drive mechanism for rotating and positioning the table around an axis, and a clamp mechanism for restricting rotation of the table, the numerical controller being adapted to control the rotary table device according to a machining program containing a plurality of instruction statements and including an unclamp adding unit that adds an unclamp operation for releasing restriction of the table immediately before execution of a table rotation instruction statement that is contained in the machining program to designate an operation of the drive mechanism and a clamp adding unit that adds a clamp operation for restricting the table immediately after execution of the table rotation instruction statement.

9 Claims, 4 Drawing Sheets

(56) References Cited

FOREIGN PATENT DOCUMENTS

| JP | H06-161527 | A | | 6/1994 | | |
|----|------------|---|---|--------|---|---|
| JP | 2011-039582 | A | | 2/2011 | | |
| JP | 2012-198734 | A | | 10/2012 | | |
| JP | 2015-087820 | A | | 5/2015 | | |
| JP | 2015155144 | A | * | 8/2015 | ............ | B23Q 17/00 |
| JP | 2015-172867 | A | | 10/2015 | | |
| JP | 2015-225617 | A | | 12/2015 | | |
| KR | 1997-0033455 | A | | 7/1997 | | |

OTHER PUBLICATIONS

International Search Report issued in PCT/JP2021/014625; mailed Jun. 15, 2021.

* cited by examiner

NUMERICAL CONTROLLER AND MACHINING SYSTEM

TECHNICAL FIELD

The present invention relates to a numerical controller and a machining system.

BACKGROUND ART

Some machining systems are provided with a rotary table device that rotates and positions a table that holds a workpiece in order to increase the degree of freedom in machining. Such a rotary table device may be provided with a clamp mechanism that restricts rotation of the table in order to prevent an angular position of the table from being displaced. For this reason, a machining program for a machining system including a rotary table device needs to describe an instruction statement for designating a clamp operation and an unclamp operation of a clamp mechanism (for example, see Patent Document 1).

Patent Document 1: Japanese Unexamined Patent Application, Publication No. 2015-225617

DISCLOSURE OF THE INVENTION

Problems to be Solved by the Invention

Since a machining program for a machining system including a rotary table device having a clamp mechanism needs to contain an instruction statement for designating a clamp operation and an unclamp operation, it becomes longer. Therefore, a risk increases that input errors occur at the time of creation of a machining program, and readability decreases, thereby making it difficult to find input errors. When a clamp operation or an unclamp operation is performed at inappropriate timings due to an error in creation of the machining program, there is a risk that machining accuracy may decrease or a device or a tool may be damaged. Further, the clamp operation and the unclamp operation are mechanical operations and therefore take time for execution. For this reason, when an instruction statement for designating the clamp operation and the unclamp operation is inserted into the machining program unnecessarily, an inconvenience is also caused that a cycle time becomes longer. Therefore, it is desirable to provide a means capable of executing the clamp operation and the unclamp operation at appropriate timings.

Means for Solving the Problems

An aspect of the present disclosure is directed to a numerical controller for use in a machining system including a rotary table device that has a table, a drive mechanism for rotating and positioning the table around an axis, and a clamp mechanism for restricting rotation of the table. The numerical controller is adapted to control the rotary table device according to a machining program containing a plurality of instruction statements and includes: an unclamp adding unit that adds an unclamp operation for releasing restriction of the table immediately before execution of a table rotation instruction statement that is contained in the machining program to designate an operation of the drive mechanism; and a clamp adding unit that adds a clamp operation for restricting the table immediately after execution of the table rotation instruction statement.

Effects of the Invention

According to the present invention, a clamp operation and an unclamp operation can be executed at appropriate timings.

PREFERRED MODE FOR CARRYING OUT THE INVENTION

Figure 1:
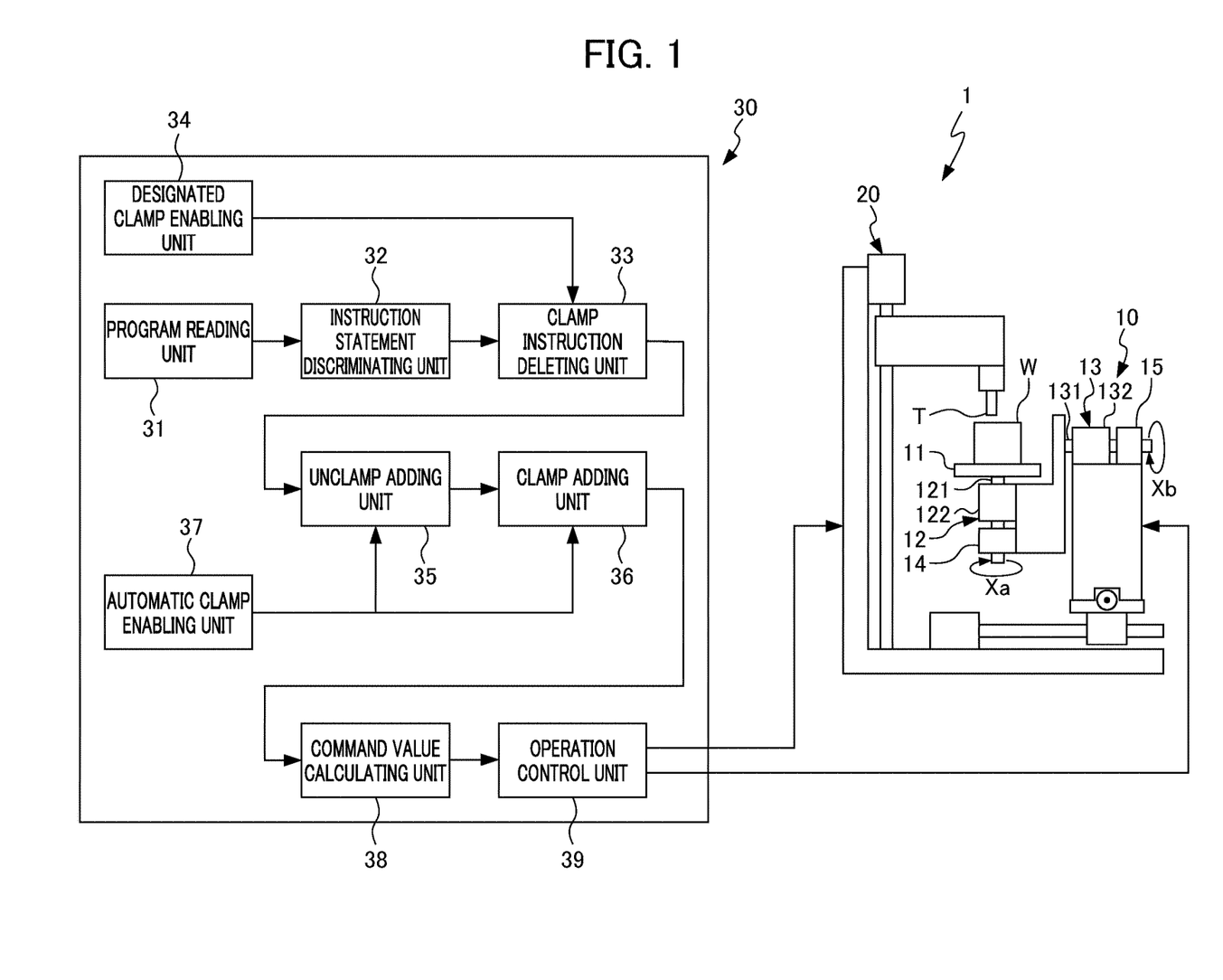
FIG. 1 is a schematic diagram showing a configuration of a machining system according to an embodiment of the present disclosure.

An embodiment of the present invention will be described below with reference to the drawings. FIG. 1 is a schematic diagram showing a configuration of a machining system 1 according to an embodiment of the present disclosure. The machining system 1 machines a workpiece W with a tool T according to a machining program.

The machining system 1 includes a rotary table device 10 that holds the workpiece W so as to enable rotational positioning, a machining device 20 that realizes positioning and driving of the tool T for machining the workpiece W, and a numerical controller 30 that controls the rotary table device 10 and the machining device 20.

The rotary table device 10 includes a table 11 that holds the workpiece W, an A-axis drive mechanism 12 that allows the table 11 to realize rotational positioning around an A-axis Xa perpendicular to a holding surface of the table 11 that holds the workpiece W, a B-axis drive mechanism 13 that allows the table 11 to realize rotational positioning around a B-axis Xb perpendicular to the A-axis Xa together with the A-axis drive mechanism 12, an A-axis clamp mechanism 14 that restricts the rotation of the table 11 around the A-axis Xa, and a B-axis clamp mechanism 15 that restricts the rotation of the table 11 around the B-axis Xb.

The table 11 holds the workpiece W so as not to move relative to itself. For this reason, the table 11 may have a fixing structure for fixing the workpiece with magnetic forces, screws, or chucks, for example. Thus, the rotary table device 10 realizes rotational positioning of the table that holds the workpiece W, thereby determining orientations of the workpiece W.

The A-axis drive mechanism 12 is connected to the table 11 at its end, and can include an A-direction rotation shaft 121 extending along the A-axis Xa and an A-axis servomotor 122 that rotates the A-direction rotation shaft 121.

The B-axis drive mechanism 13 can include a B-direction rotation shaft 131 extending along the B-axis Xb and holding the A-axis servomotor 122 at one end and a B-axis servomotor 132 that rotates the B-direction rotation shaft 131.

The A-axis clamp mechanism 14 may have a well-known configuration in which a brake pad press-contacts with a brake disk fixed to the A-direction rotation shaft 121 of the A-axis drive mechanism 12 to restrict the rotation of the A-direction rotation shaft 121.

Similarly to the A-axis clamp mechanism 14, the B-axis clamp mechanism 15 may have a well-known configuration in which a brake pad press-contacts with a brake disk fixed to the B-direction rotation shaft 131 of the B-axis drive mechanism 13 to restrict the rotation of the B-direction rotation shaft 131.

The machining device 20 can include a plurality of drive shafts that determine a position of the tool T relative to the table 11 and the workpiece W and a tool shaft that drives the tool T to rotate. In the shown embodiment, the machining device 20 is configured to determine the position of the tool T relative to the workpiece W by moving the rotary table device 10 in a horizontal direction and moving the tool T in a vertical direction. The plurality of drive shafts and the tool shaft can be driven by servomotors, respectively.

The numerical controller 30 controls the rotary table device 10 and the machining device 20 according to a machining program. The machining program includes a plurality of instruction statements (blocks) described in a language such as G-code. The numerical controller 30 is an embodiment of the numerical controller according to the present disclosure. There is a plurality of types of instruction statements including a tool rapid positioning instruction statement for specifying high-speed movement used during movement of the tool T without cutting, a tool cutting-feed instruction statement for specifying low-speed movement used during movement of the tool T with cutting, a table rotation instruction statement for specifying rotation of the table 11, and a clamp instruction statement for specifying operations of the clamp mechanisms 14 and 15. The table rotation instruction statement can be further categorized into a table rapid positioning instruction statement without cutting and a table cutting-feed instruction statement with cutting.

The numerical controller 30 includes a program reading unit 31, an instruction statement discriminating unit 32, a clamp instruction deleting unit 33, a designated clamp enabling unit 34, an unclamp adding unit 35, a clamp adding unit 36, an automatic clamp enabling unit 37, a command value calculating unit 38, and an operation control unit 39. The numerical controller 30 can be implemented by causing a computer device including a memory, a CPU, and an input/output interface to execute an appropriate control program. The above-described components of the numerical controller 30 are classified functions of the numerical controller 30, and may not be clearly distinguishable in physical configuration and program configuration.

The program reading unit 31 reads a machining program from an external or internal storage device into a working memory in units of instruction statements. The program reading unit 31 reads a plurality of instruction statements within a range allowed by the working memory. In other words, the reading of the machining program by the program reading unit 31 is performed beforehand regardless of the operations of the rotary table device 10 and the machining device 20. The program reading unit 31 may translate the instruction statement of the machining program into a data format that can be easily processed by the numerical controller 30.

A conventional machining program and a program that allows the numerical controller 30 of the present embodiment to perform the same operation are exemplified. In the machining program, bracketed texts are descriptions to facilitate an operator's understanding, and are comment texts that the numerical controller 30 does not recognize as instruction statements.

<Conventional Machining Program>
   M11; (unclamp command)
   G00B90.; (B-axis rapid positioning command)
   M10; (clamp command)
     Z-50.; (Z-axis rapid positioning command)
     G01Z-100. F1000; (Z-axis cutting-feed command)

<Machining Program of Present Embodiment>
   (auto unclamp)
   G00B90.; (B-axis rapid positioning command)
   (auto clamp)
   Z-50.; (Z-axis rapid positioning command)
   G01Z-100. F1000; (Z-axis cutting-feed command)

As described above, in the conventional machining program, an instruction statement called G-code is used to designate driving of the drive shaft, and an instruction statement called M-code is used to designate an unclamp operation and a clamp operation. On the other hand, the instruction statement for designating the unclamp operation and the clamp operation is not described in the machining program of the present embodiment. In the exemplified machining program, comment texts indicating the timing of "auto unclamp" and "auto clamp" are inserted for easy understanding, but the numerical controller 30 intends to be able to create a machining program without being conscious of such operations, and thus such comment texts are not normally inserted.

The instruction statement discriminating unit 32 discriminates the type of the instruction statement read by the program reading unit 31. The instruction statement discriminating unit 32 stores a plurality of types of instruction statements.

When the instruction statement to be processed is a clamp instruction statement, the clamp instruction deleting unit 33 performs a deletion of such an instruction statement. The term "deletion" means to treat the instruction statement as if it does not exist, and includes, for example, a case where the command value calculating unit 38 does not recognize it as an instruction statement according to a method of adding a disablement flag.

The designated clamp enabling unit 34 enables and disables the clamp instruction deleting unit 33. In other words, the designated clamp enabling unit 34 selects either a state of enabling clamp instruction deleting unit 33 and deleting the clamp instruction statement or a state of disabling the clamp instruction deleting unit 33 and not deleting the clamp instruction statement. The designated clamp enabling unit 34 may be configured to allow the user to select the enablement and the disablement of the clamp instruction deleting unit 33, or may be configured such that the enablement and the disablement of the clamp instruction deleting unit 33 can be designated in a header of the machining program.

The unclamp adding unit 35 adds an unclamp operation for releasing the restriction of the table 11 immediately before execution of the table rotation instruction statement. Specifically, the unclamp adding unit 35 can add an instruction (a command value generation instruction for the command value calculating unit 38) for designating opening of the A-direction rotation shaft 121 or the B-direction rotation shaft 131 by the A-axis clamp mechanism 14 or the B-axis clamp mechanism 15 corresponding to the A-axis Xa or the B-axis Xb for which the table rotation instruction statement designates rotation, immediately before the table rotation instruction statement. The expression "adding an instruction" does not necessarily mean adding an instruction statement at a state of the machining program, but may be generation of a flag in an internal processing stage based on the machine program such that command signals to the clamp mechanisms 14 and 15 can be output. As a specific example, the unclamp adding unit 35 can be described as a relay that performs an unclamp operation triggered by a rise of an internal signal (flag) indicating that the table rotation instruction statement is being executed in a ladder program of a programmable logic controller (sequencer) that performs sequential performing of command value output, and can be configured to generate an internal signal that causes the command value to be output.

When the state immediately before execution of the target table rotation instruction statement is not a clamped state, the unclamp adding unit 35 may be configured not to add the unclamp operation. Further, even when the state immediately before execution of the table rotation instruction statement on the target rotation axis (A-axis Xa or B-axis Xb) is a clamped state, the unclamp adding unit 35 may be configured not to add the unclamp operation, and may be configured not to add the unclamp operation regardless of the axis for which rotation is designated. In other words, the unclamp adding unit 35 may add unclamp operations individually to each of the rotation axes Xa and Xb, or may add the unclamp operation collectively to the plurality of axes Xa and Xb for which rotation is designated in the plurality of consecutive table rotation instruction statements, immediately before executing the first table rotation instruction statement.

The clamp adding unit 36 adds a clamp operation for restricting the table 11 immediately after execution of the target table rotation instruction statement. Specifically, the clamp adding unit 36 can add an instruction for designating fixation of the A-direction rotation shaft 121 or the B-direction rotation shaft 131 by the A-axis clamp mechanism 14 or the B-axis clamp mechanism 15 corresponding to the A-axis Xa or the B-axis Xb for which the table rotation instruction statement designates rotation, immediately after the table rotation instruction statement. The clamp adding unit 36 can be described as a relay that performs a clamp operation triggered by a fall of an internal signal (flag) indicating that the table rotation instruction statement is being executed in a ladder program of a programmable logic controller.

The clamp adding unit 36 may be configured not to add the clamp operation in a case where the table rotation instruction statement directed to the unclamp adding unit 35 is immediately followed by another table rotation instruction statement. Specifically, only when the rotation axis (A-axis Xa or B-axis Xb) for which the target table rotation instruction statement designates rotation matches the axis for which the immediately following table rotation instruction statement designates rotation, the clamp adding unit 36 may be configured not be add the clamp operation, and may be configured not to add the clamp operation regardless of the axis for which rotation is designated. In other words, similarly to the unclamp adding unit 35, the clamp adding unit 36 may add clamp operations individually to each of the rotation axes Xa and Xb, or may add the clamp operation collectively to the axes Xa and Xb for which rotation is designated in the plurality of consecutive table rotation instruction statements, immediately after executing the last table rotation instruction statement.

The clamp adding unit 36 may be configured not to add the clamp operation immediately after the execution of the target table rotation instruction statement during the cutting operation. In addition, when the instruction statement following the target table rotation instruction statement is a preset type of instruction statement, for example, a cutting feed that designates movement of the tool T accompanying the machining of the machining device 20, the preset type of operation among the operations designated by the following instruction statement may be prohibited until the clamp operation immediately after the table rotation instruction statement is completed. Specifically, the clamp adding unit 36 may be configured to set a flag that a preset type of operation should be prohibited until the clamp operation to be added is completed. In other words, when the instruction statement following the target table rotation instruction statement is not the preset type of instruction statement, it may be permitted to simultaneously perform the clamp operation added by the clamp adding unit 36 and the operation of the following instruction statement.

The automatic clamp enabling unit 37 enables and disables the unclamp adding unit 35 and the clamp adding unit 36. The automatic clamp enabling unit 37 can be configured to enable and disable the unclamp adding unit 35 and the clamp adding unit 36 in response to the machining program or the input of the user, like the designated clamp enabling unit 34.

Next, an alternative machining program is exemplified which includes a case where the designated clamp enabling unit 34 and the automatic clamp enabling unit 37 enable the clamp instruction deleting unit 33, the unclamp adding unit 35, and the clamp adding unit 36 (function ON) and a case where the designated clamp enabling unit 34 and the automatic clamp enabling unit 37 disable the clamp instruction deleting unit 33, the unclamp adding unit 35, and the clamp adding unit 36 (function OFF).

<Alternative Machining Program>
    Function ON
        (auto unclamp)
    G00B45.; (B-axis rapid positioning command)
        (auto clamp)
    Function OFF
    M11; (unclamp command)
    G00B90.; (B-axis rapid positioning command)
    M10; (clamp command)

By causing the designated clamp enabling unit 34 and the automatic clamp enabling unit 37 to function in this way, the clamp operation and the unclamp operation according to the clamp instruction statement included in the machining program and designating the operation of the clamp mechanisms 14 and 15, the unclamp operation by the unclamp adding unit 35, and the clamp operation by the clamp adding unit 36 can be executed in the same machining program.

The numerical controller 30 may be configured to cause the designated clamp enabling unit 34 and the automatic clamp enabling unit 37 to function independently, and enable the unclamp adding unit 35 and the clamp adding unit 36 in a state of disabling the clamp instruction deleting unit 33, whereby both the clamp operation and the unclamp operation included in the machining program, and the unclamp operation and the clamp operation added by the unclamp adding unit 35 and the clamp adding unit 36 can be executed.

The command value calculating unit 38 calculates an appropriate value of the command value for each of the axes Xa and Xb of the rotary table device 10 and each axis of the machining device 20 every time so as to realize the contents of the machining program in which the clamp operation and the unclamp operation are added or deleted by the other components described above. A method of calculating the command value can be the same as in the conventional numerical control.

The operation control unit 39 stores the command values calculated by the command value calculating unit 38, and outputs the stored command values to the rotary table device 10 and the machining device 20 on time.

Figure 2:
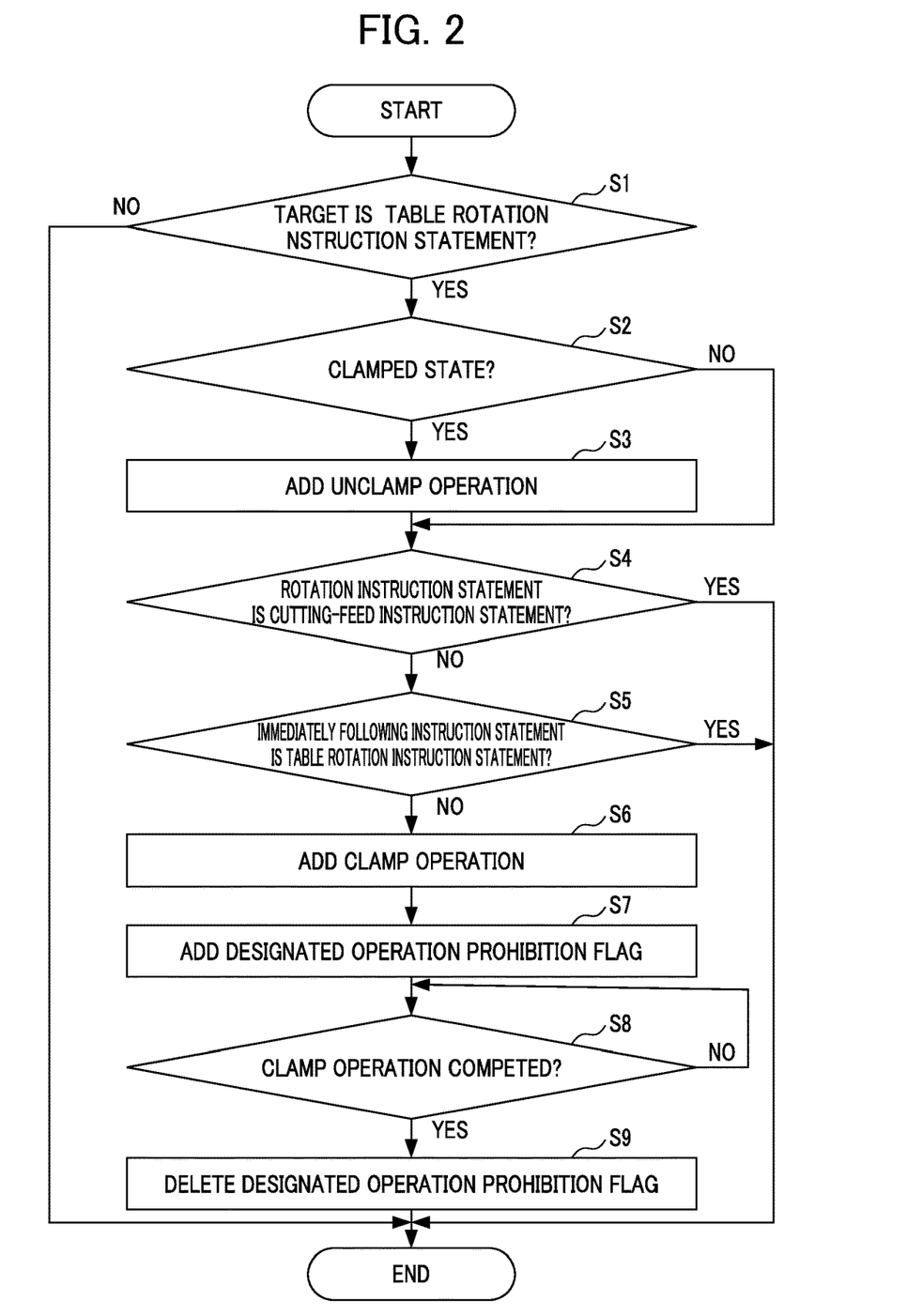
FIG. 2 is a flowchart showing a flow of processing related to control of clamp mechanisms in the numerical controller shown in FIG. 1.

FIG. 2 shows a flow of processing related to the control of the clamp mechanisms 14 and 15 in the numerical controller 30. The control of the clamp mechanisms 14 and 15 includes a target instruction statement confirming process (Step S1), a clamped state confirming process (Step S2), an unclamp operation adding process (Step S3), a cutting operation confirming process (Step S4), an immediately following rotation instruction statement confirming process (Step S5), a clamp operation adding process (Step S6), a designated operation prohibition flag adding process (Step S7), a clamp completion confirming process (Step S8), and a designated operation prohibition flag deleting process (Step S9). Such processing is performed for each instruction statement of the machining program.

In the target instruction statement confirming process of Step S1, it is confirmed whether the target instruction statement for control is a table rotation instruction statement. When the target instruction statement is the table rotation instruction statement, the process proceeds to Step S2. When the target instruction statement is not the table rotation instruction statement, the processing for the instruction statement is ended, and when the machining program continues, the same processing is started for the next instruction statement.

In the clamped state confirming process of Step S2, it is confirmed whether a state immediately before execution of the target instruction statement is a clamped state. When the state immediately before execution is a clamped state, the process proceeds to the next Step S3, and when the state immediately before execution is not a clamped state, the process proceeds to Step S4.

In the unclamp operation adding process of Step S3, an instruction for designating the unclamp operation is added immediately before the target instruction statement.

In the cutting operation confirming process of Step S4, it is confirmed whether a cutting operation is being performed at the time of execution of the target instruction statement. It can be determined that a cutting operation is being performed when the target instruction statement is a table cutting-feed instruction statement. Further, when there is an instruction statement for designating the start of the cutting operation before the target instruction statement and when there is no instruction statement for designating the end of the cutting operation between the instruction statement for designating the start of the cutting operation and the target instruction statement, it may be determined that a cutting operation is being performed at the time of execution of the target instruction statement. When the cutting operation is being performed at the time of execution of the target instruction statement, the processing for the instruction is ended, and when the cutting operation is not being performed, the process proceeds to Step S5.

In the immediately following instruction statement confirming process of Step S5, it is confirmed whether an instruction statement immediately following the target instruction statement is a table rotation instruction statement. When the immediately following instruction statement is a table rotation instruction statement, the processing for the instruction is ended, and when the immediately following instruction statement is not a table rotation instruction statement, the process proceeds to Step S6.

In the clamp operation adding process of Step S6, an instruction for designating a clamp operation is added immediately after the target instruction statement.

In the designated operation prohibition flag adding process of Step S7, a designated operation prohibition flag indicating that a preset type of operation should be prohibited is added.

In the clamp completion confirming process of Step S8, it is confirmed whether the clamp operation instruction added in Step S6 has been completed. When the clamp operation has not been completed, confirmation is made again, and when the clamp operation has been completed, the process proceeds to Step S9.

In the designated operation prohibition flag deleting process of Step S9, the designated operation prohibition fag added in Step S7 is deleted.

As described above, the numerical controller 30 includes the unclamp adding unit 35 and the clamp adding unit 36, and even when the instruction for designating the operations of the clamp mechanisms 14 and 15 is not described in the machining program, the clamp operation and the unclamp operation of the clamp mechanisms 14 and 15 can be automatically executed at appropriate timings. Thus, the machining program can be simplified, human error in creating the machining program can be prevented, and the machining cycle time can be prevented from becoming unnecessarily long.

When the state immediately before execution of the target table rotation instruction statement is an unclamped state, the unclamp adding unit 35 is configured not to add the unclamp operation, and when the instruction statement immediately following the target table rotation instruction statement is a table rotation instruction statement, the clamp adding unit is configured not to add the clamp operation, whereby unnecessary unclamp operation and clamp operation cannot be performed and the cycle time can be shortened. In particular, when a plurality of table rotation instruction statements are consecutive, the unclamp operation is collectively added to the axis for which rotation is designated in the plurality of consecutive table rotation instruction statements immediately before the unclamp adding unit 35 executes the first table rotation instruction statement, the clamp operation is collectively added immediately after the clamp adding unit executes the last table rotation instruction statement, and thus the cycle time can be further shortened.

In the numerical controller 30, the clamp adding unit 36 is configured not to add the clamp operation immediately after the execution when the table rotation instruction statement is performed during the cutting operation, whereby a decrease in machining accuracy can be prevented. It should be noted that "the table rotation instruction statement is performed during the cutting operation" means that the workpiece mounted on the table is being cut while being rotated. Since a clamp is not necessary when the workpiece is being cut while being rotated, an unnecessary clamp is not added, and thus an increase in cycle time associated with the clamp operation can be prevented.

In the numerical controller 30, when the instruction statement immediately following the table rotation instruction statement is a preset type of instruction statement, the clamp adding unit 36 is configured to add a flag for prohibiting a preset type of operation until the clamp operation immediately after the table rotation instruction statement is completed, for example, the operation related to the cutting operation is prohibited until the clamp operation is completed, whereby a machining defect can be prevented. It should be noted that the expression "prohibiting the designated operation" means that an undesignated operation can be performed in parallel with the clamp operation. Thus, an operation not affecting machining accuracy can be performed in parallel with the clamp operation, and thus an increase in cycle time associated with the clamp operation can be prevented.

Since the numerical controller 30 includes the automatic clamp enabling unit 37 that enables and disables the unclamp adding unit 35 and the clamp adding unit 36, it can stop the addition of the automatic unclamp operation and clamp operation can be stopped, and can perform the unclamp operation and the clamp operation according to the instructions described in the machining program as in the conventional technique. For example, in indexing machining where a machining load is relatively small, machining may be made without clamping. In such a case, the clamping is disabled, whereby an increase in cycle time can be prevented. It should be noted that for example, describing a command for enablement and a command for disablement in the machining program makes it possible to perform enablement and disablement during the execution of the machining program.

Since the numerical controller 30 includes the clamp instruction deleting unit 33 and the designated clamp enabling unit 34, the unclamp operation and the clamp operation can be performed only according to the unclamp adding unit 35 and the clamp adding unit 36 without regard of the unclamp operation and the clamp operation described in the machining program, and the unclamp operation and the clamp operation can be performed according to the machining program as in the conventional technique.

When the designated clamp enabling unit 34 enables the clamp according to the program and the automatic clamp enabling unit 37 enables the unclamp addition and the clamp addition, both the clamp according to the program and the auto clamp are enabled. In general, when the program configuration permits commands and does not affect machining accuracy, the cycle time can be shortened by performing the unclamp operation simultaneously with other operations prior to the rotating operation. In this way, both the clamp according to the program and the auto clamp can be used, and thus the cycle time can be further shortened.

Figure 3:
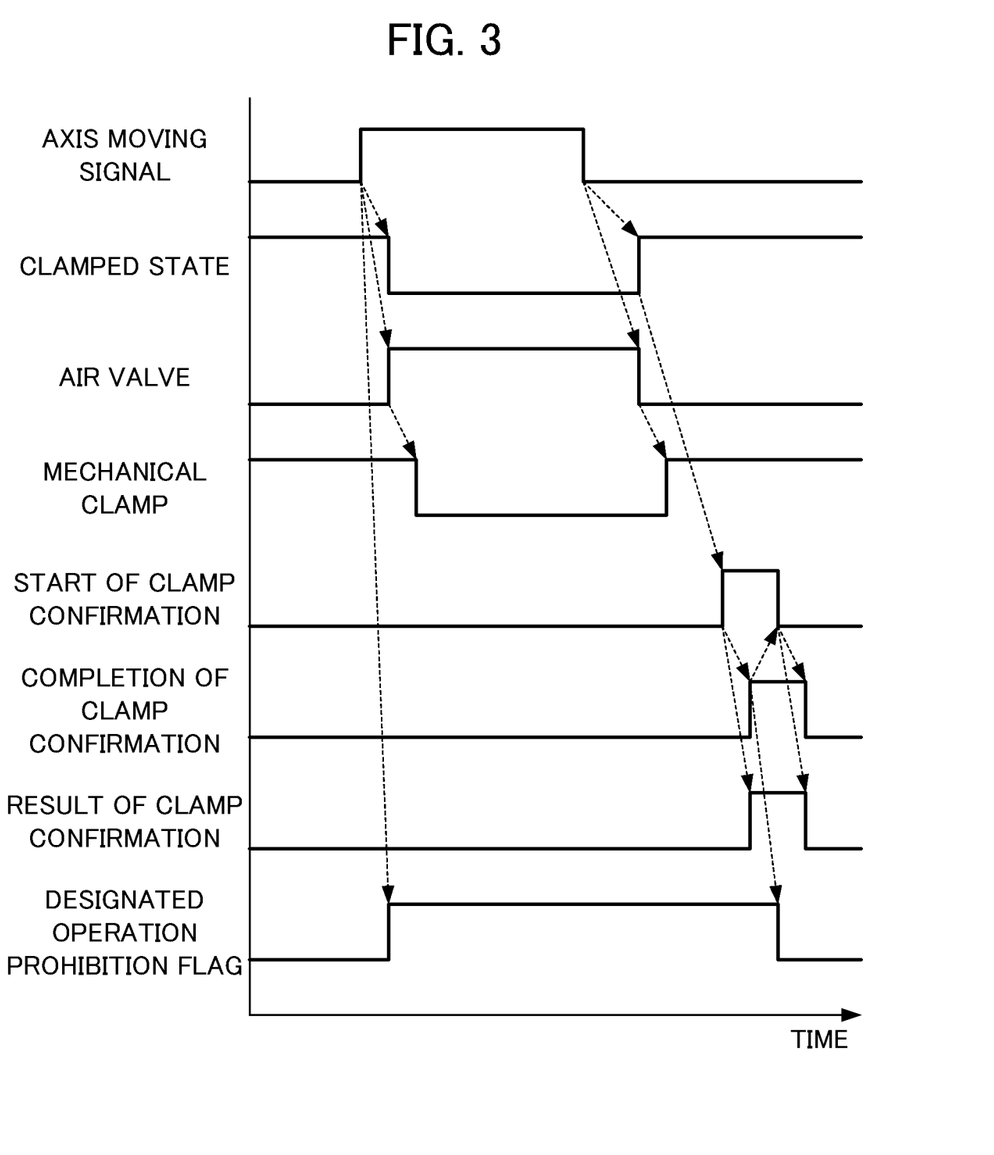
FIG. 3 is a time chart showing a signal change at the time of execution of a table rapid positioning instruction statement.
Figure 4:
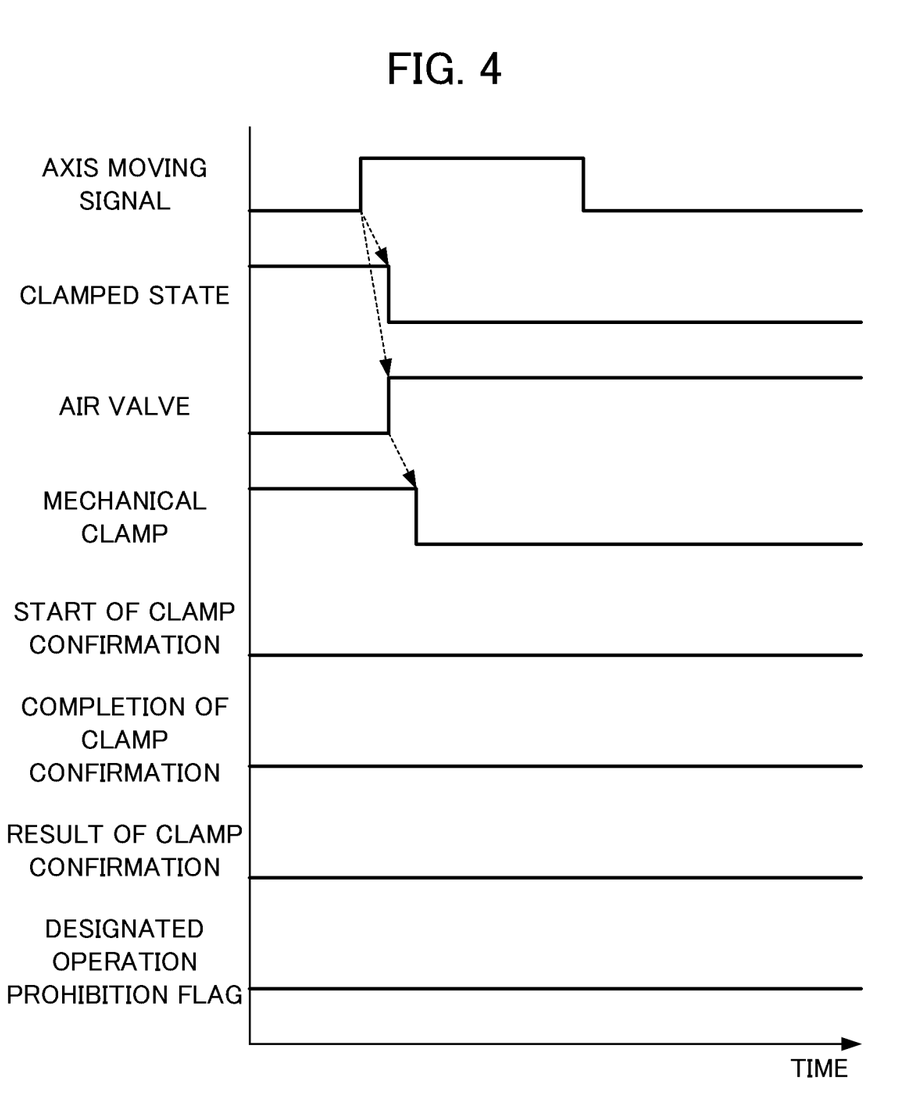
FIG. 4 is a time chart showing a signal change at the time of execution of a table cutting-feed instruction statement.

FIGS. 3 and 4 shows time charts showing a signal change at the time of execution of the table rapid positioning instruction statement and a signal change at the time of execution of the table cutting-feed instruction statement, respectively, taking a case of adding an unclamp operation and a clamp operation in a programmable logic controller as an example. Dashed arrows in the time charts indicate a relationship between a trigger signal and a signal of which state is determined by the trigger signal. An appropriate signal is selected as a trigger in this way, and thus an unclamp operation and a clamp operation can be added at appropriate timings.

Although the embodiment of the present invention has been described above, the present invention is not limited to the above-described embodiment. The effects described in the present embodiment merely exemplify the most preferable effects arising from the present invention, and the effects of the present invention are not limited to those described in the present embodiment.

The rotary table device according to the present disclosure may realize rotational positioning of objects other than the workpiece, for example, a measuring instrument and a tool.

In addition, the rotary table device according to the present disclosure may be used in systems other than the machining system.

Each of the components in the above-described embodiment can be omitted within a range in which a minimum function can be maintained in light of common technical knowledge.

EXPLANATION OF REFERENCE NUMERALS

1: machining system
10: rotary table device
11: table
12: A-axis drive mechanism
13: B-axis drive mechanism
14: A-axis clamp mechanism
15: B-axis clamp mechanism
20: machining device
30: numerical controller
31: program reading unit
32: instruction statement discriminating unit
33: clamp instruction deleting unit
34: designated clamp enabling unit
35: unclamp adding unit
36: clamp adding unit
37: automatic clamp enabling unit
38: command value calculating unit
39: operation control unit
Xa: A-axis
Xb: B-axis
W: workpiece

The invention claimed is:

1. A numerical controller for use in a machining system including a rotary table device that has a table, a drive mechanism for rotating and positioning the table around an axis, and a clamp mechanism for restricting rotation of the table, the numerical controller being adapted to control the rotary table device according to a machining program containing a plurality of instruction statements and comprising:
an unclamp adding unit that adds an unclamp operation for releasing restriction of the table immediately before execution of a table rotation instruction statement that is contained in the machining program to designate an operation of the drive mechanism;
a clamp adding unit that adds a clamp operation for restricting the table immediately after execution of the table rotation instruction statement;
a clamp instruction deleting unit that deletes a clamp instruction statement contained in the machining program to designate an operation of the clamp mechanism; and
a designated clamp enabling unit that enables and disables the clamp instruction deleting unit.

2. The numerical controller according to claim 1, wherein the unclamp adding unit does not add an unclamp operation in a case where a state immediately before execution of the table rotation instruction statement as a target is an unclamped state, and
the clamp adding unit does not add a clamp operation in a case where the table rotation instruction statement as the target is immediately followed by another table rotation instruction statement that is same as the table rotation instruction statement.

3. The numerical controller according to claim 2, wherein for an axis for which rotation is designated in a plurality of the table rotation instruction statements that are consecutive, the unclamp adding unit collectively adds the unclamp operation immediately before execution of a first one of the plurality of table rotation instruction statements, and for the axis for which rotation is designated in the plurality of the table rotation instruction statements that are consecutive, the clamp adding unit collectively adds the clamp operation immediately after execution of a last one of the plurality of table rotation instruction statements.

4. The numerical controller according to claim 1, wherein the clamp adding unit does not add the clamp operation immediately after execution of the table rotation instruction statement in a case where the table rotation instruction statement is executed during a cutting operation.

5. The numerical controller according to claim 1, wherein the clamp adding unit prohibits a preset type of operation until the clamp operation immediately after the table rotation instruction statement is completed.

6. The numerical controller according to claim 1, further comprising:

an automatic clamp enabling unit that enables and disables the unclamp adding unit and the clamp adding unit.

7. The numerical controller according to claim 1, wherein the numerical controller is capable of executing, in a same machining program, the clamp operation and the unclamp operation by a clamp instruction statement contained in the machining program to designate an operation of the clamp mechanism, the unclamp operation by the unclamp adding unit, and the clamp operation by the clamp adding unit.

8. A machining system comprising:
the numerical controller according to claim 1; and
a rotary table device that is controllable by the numerical controller.

9. A numerical controller for use in a machining system including a rotary table device that has a table, a drive mechanism for rotating and positioning the table around an axis, and a clamp mechanism for restricting rotation of the table, the numerical controller being adapted to control the rotary table device according to a machining program containing a plurality of instruction statements and comprising:

an unclamp adding unit that adds an unclamp operation for releasing restriction of the table immediately before execution of a table rotation instruction statement that is contained in the machining program to designate an operation of the drive mechanism; and a clamp adding unit that adds a clamp operation for restricting the table immediately after execution of the table rotation instruction statement, wherein the numerical controller is capable of executing, in a same machining program, the clamp operation and the unclamp operation by a clamp instruction statement contained in the machining program to designate an operation of the clamp mechanism, the unclamp operation by the unclamp adding unit, and the clamp operation by the clamp adding unit.

* * * * *